United States Patent [19]

Sato et al.

[11] Patent Number: 4,986,137
[45] Date of Patent: Jan. 22, 1991

[54] STRAIN DETECTOR WITH MAGNETOSTRICTIVE ELEMENTS

[75] Inventors: Hiroshi Sato; Yoshihiko Utsui; Hideo Ikeda; Chiyo Hamamura, all of Amagasaki, Japan

[73] Assignee: Mitsubishi Denki Kabushiki Kaisha, Japan

[21] Appl. No.: 444,808

[22] Filed: Dec. 1, 1989

[30] Foreign Application Priority Data

Dec. 6, 1988 [JP] Japan ................... 63-309218
Dec. 6, 1988 [JP] Japan ................... 63-309219
May 17, 1989 [JP] Japan ................... 1-123313

[51] Int. Cl.$^5$ ............................... G01L 3/10
[52] U.S. Cl. ................................... 73/862.36
[58] Field of Search ......... 73/862.36, 862.69, DIG. 2; 324/209

[56] References Cited

U.S. PATENT DOCUMENTS

| 3,861,206 | 1/1975 | Kawafune et al. | |
| 4,414,855 | 11/1983 | Iwasaki | 73/862.36 |
| 4,651,573 | 3/1987 | Himmelstein | 73/862.36 |
| 4,765,192 | 8/1988 | Hase et al. | 73/862.36 |

FOREIGN PATENT DOCUMENTS

| 0079238 | 5/1985 | Japan | 73/862.36 |
| 0260821 | 12/1985 | Japan | 73/862.36 |
| 0294322 | 12/1986 | Japan | 73/862.36 |

OTHER PUBLICATIONS

IEEE Transactions on Magnetics, vol. MAG-20, No. 5, Sep. 1984, pp. 951-953, in "Torque Transducers with Stress-Sensitive Amorphous Ribbons of Chevron-Pattern" (Sasada et al.).

Primary Examiner—Charles A. Ruehl
Attorney, Agent, or Firm—Leydig, Voit & Mayer

[57] ABSTRACT

A strain detector for detecting a strain developed in a shaft applied with a torque comprises strain-sensitive magnetostrictive elements attached to the shaft in two groups in a chevron pattern. A pair of annular detection coils are wound around a bobbin to surround respective one of the groups of magnetostrictive elements. Two annular yokes made of a soft magnetic material of high permeability are disposed around respective coils across radial gaps. A hollow cylindrical shield of non-magnetic material with a high electrical conductivity is disposed around the two yokes across radial gaps. The magnetostrictive elements may be made of a nickel-iron alloy of 45 to 55% Ni-Fe. The yokes may be made of a nickel-iron alloy of about 80% Ni-Fe or alternatively, of a 6.5% Si-Fe steel. The detector may comprise a second magnetic shield disposed around the first shield of non-magnetic material with a high electrical conductivity. The second shield may be made of the same magnetic material as the yokes.

14 Claims, 3 Drawing Sheets

STRAIN DETECTOR WITH MAGNETOSTRICTIVE ELEMENTS

BACKGROUND OF THE INVENTION

This invention relates to non-contact type strain detectors for detecting strains developed by the torque applied to a shaft of rotating machines, etc., on the basis of the magnetostrictive effect without direct contact with the shaft.

Recently, proposals have been made of non-contact type strain detectors (also called torque transducers or torque sensors) utilizing stress- or strain-senstive ribbon-shaped thin elements attached to a shaft in a chevron-pattern. FIG. 1 shows an example of such a strain detector, which is disclosed, for example, in Japanese Published Unexamined Patent Application No. 57-211030. As shown in FIG. 1, on the side surface of a driven shaft 1 to which a torque is applied are attached a plurality of magnetostrictive elements 2 and 3 in a chevron pattern. The elements are made of a soft magnetic material having a permeability that varies in accordance with the magnitude of the strain developed therein by the torque applied to the shaft 1. The strain-sensitive elements are arranged in two parallel groups of ribbons 2 and 3 oriented at +45 and 31 45 degrees, respectively, with respect to the axis of the shaft 1. Annular detection coils 4 and 5 are wound around the two groups of magnetostrictive strain-sensitive elements 2 and 3, respectively, for detecting variations in the permeability thereof.

The method of operation of the strain detector of FIG. 1 is as follows. When a torque is applied to the shaft 1, principal stresses are generated in the shaft 1 and hence in the elements 2 and 3 attached thereto along principal axes having directions which agree with the longitudinal directions of the two groups of magnetostrictive elements 2 and 3, respectively. These principal stresses act as a tensile force on one of the two groups 2 and 3 of magnetostrictive elements, and as a compressive force on the other of the two groups. This causes variations in the permeabilities of these magnetostrictive elements 2 and 3 as follows. Generally, when a stress is applied to a magnetic material, its magnetic properties are changed to vary its permeability (i.e., the permeability increases or decreases depending on the case). This effect, corresponding to the Villari effect by which the permeability of a magnetic material is changed in accordance with the deformation or strain developed therein, is utilized in magnetostriction transducers which convert mechanical energy into electrical energy. The constant which represents quantitatively the magnitude of the magnetostrictive response of a magnetic material is called the magnetostrictive constant. The magnetostrictive constant of a material represents quantitatively the dependance of its permeability or susceptibility on the strain developed therein. When the value of the magnetostrictive constant is positive, the permeability increases under a tensile force; when its value is negative, the effect is reversed. Thus, the permeabilities of the two groups of elements 2 and 3 are increased or decreased in accordance with the deformation generated therein corresponding to the amount of torque applied to the shaft 1. These variations in the permeabilities of the two groups of elements 2 and 3 are detected by coils 4 and 5, respectively, as variations in the magnetic impedance. Thus, the strain in the shaft 1 can be detected without direct contact therewith.

These non-contact type strain detectors are excellent in principle; however, there still remains room for their improvement. Thus, many proposals have been made for the improvements of strain detectors of the above type.

For example, Japanese Published Unexamined Patent Application No. 59-180338 teaches a torque sensor in which a magnetic core made of an amorphous alloy is utilized in the detection of the variation of magnetic characteristics. Further, Japanese Published Unexamined Patent Application No. 60-260821 discloses a torque sensor in which a yoke made of a copper-nickel type amorphous alloy is provided for preventing magnetic flux leakage to the exterior of the detection coil.

However, these proposals for the improvement of non-contact type magnetostrictive strain sensors are not sufficient. Namely, since the Curie temperature of amorphous magnetic materials is low, the magnetic properties thereof tend to vary over time. Further, bands of these materials exhibit anisotropy in the longitudinal direction due to the production process thereof. As a result, when they are disposed as a magnetic yoke around a shaft in the form of multiple layers, anisotropy perpendicular to the direction of the magnetic flux is inevitable; although improvements thereof by means of heat treatments in magnetic fields have been attempted, such treatments are accompanied by handling difficulties caused by the brittleness of the material and can not ensure secure adhession of the material. Further, the disadvantage of the amorphous magnetic alloys utilized as the material of the magnetostrictive elements is that the magnetostrictive constants thereof are not sufficiently great to guarantee high enough sensitivity of the strain detector. In addition, when they are utilized as the material of the magnetic yoke, noises are generated due to the resonance caused by the magnetostriction.

Furthermore, since the above-mentioned devices comprise no magnetic shields, the prevention of the magnetic flux leakage and the protection against exterior magnetic disturbances have not been enough. In addition, the support structure of the magnetic yokes is not clear, and the magnetic characteristics of the yokes may suffer variation under application of thermal stresses from other members.

SUMMARY OF THE INVENTION

It is therefore a primary object of this invention to provide a non-contact type strain detector of the above type which has enhanced detection accuracy and sensitivity. More particularly, this invention aims at providing a strain detector which is protected from exterior magnetic disturbances and in which the magnetic yokes surrounding the detection coils for passing the magnetic flux therethrough are free from application of stresses from other members so that accurate strain detection is ensured.

It is a further object of this invention to provide a strain detector which does not generate acoustic noises in the yokes and in which the measurement is not disturbed by the magnetostriction of the magnetic yokes.

It is an additional object of this invention to provide a strain detector whose assembly steps, especially the winding step of the detection coils or that of the magnetic yokes, can be performed easily.

The strain detector according to this invention comprises, in addition to the magnetostrictive elements attached to the shaft whose strain is to be measured, a detection coil surrounding the magnetostrictive elements, a hollow cylindrical yoke of a soft magnetic material of high permeability which surrounds the detection coil, and a hollow magnetic shield surrounding the yoke, wherein radial gaps are formed between the yoke and the coil and between the yoke and the shield. The magnetic yoke enhances the detection sensitivity and the magnetic shield provides protection against external magnetic disturbances. In addition, thanks to the provision of the radial gaps mentioned above, the magnetic yoke is freed from external stresses which may develop strains in the yoke to vary the permeability thereof. Hence the adverse effects of such stresses on the accuracy of the strain measurement are minimized.

In a preferred form, the magnetostrictive elements are made of a nickel-iron alloy containing 45 to 55 wt. % nickel. On the other hand, the yoke is preferably made of a soft magnetic materal of high permeability with zero or negligible magnetostriction, such as a nickel-iron alloy containing 70 to 80 wt. %, preferrably about 80 wt. %, nickel, or a steel comprising 6.5% Si and a balance of Fe. The use of these materials prevents the generation of acoustic noises in the yoke and ensures accuracy of the measurement of the strain in the shaft. The magnetic shield may consist of a hollow cylindrical shield of a non-magnetic material of high electrical conductivity. It may further comprise an outer hollow cylindrical shield made of a soft magnetic material of high permeability, which may be a nickel-iron alloy containing 70 to 80 wt. % nickel, or the 6.5% Si-Fe steel.

In the case where the magnetostrictive elements are divided into two axially spaced groups and two detection coils are provided for each of the groups, it is preferred that the two coils are wound around a single integrally formed coil bobbin of a non-magnetic material, while two separate yokes are provided for each of the coils.

BRIEF DESCRIPTION OF THE DRAWINGS

In the drawings, like reference numerals represent like or corresponding parts or portions.

DETAILED DESCRIPTION OF THE PREFERRED EMBODIMENTS

Figure 2:
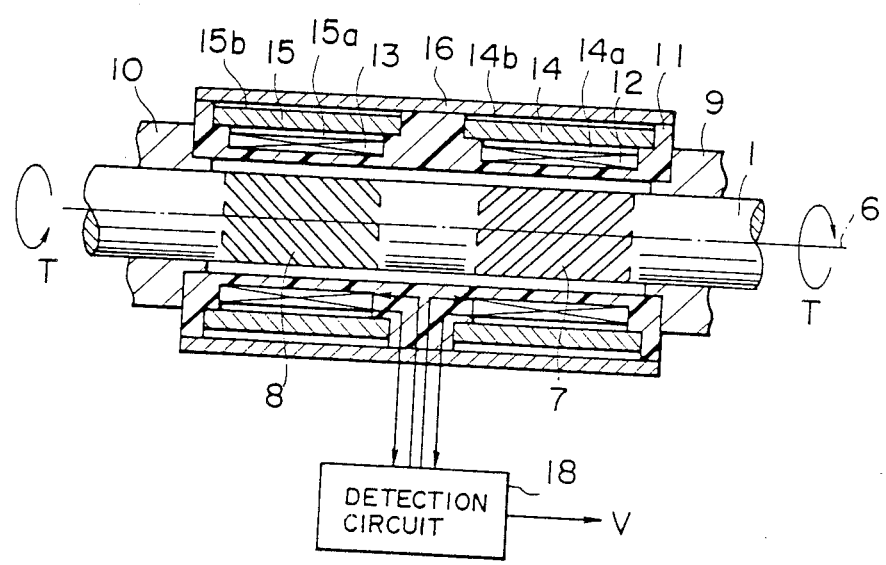
FIG. 2 is a sectional side view of a strain detector according to a first embodiment of this invention.

FIG. 2 shows the fundamental structure of a embodiment of the strain detector according to this invention.

Figure 1:
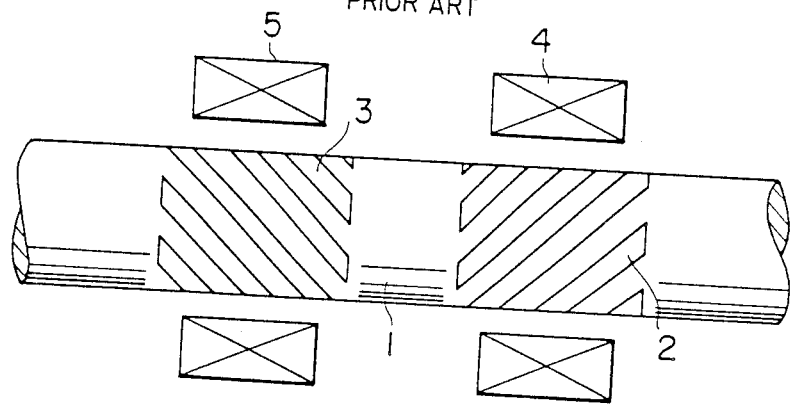
FIG. 1 is a partially sectional side view of a conventional strain detector.

On the circumferential surface of a driven shaft 1 rotated around a central axis 6 are attached two parallel groups of thin plate- or ribbon-shaped strain-sensitive magnetostrictive elements 7 and 8 arranged in a chevron pattern as in the case of the groups of magnetostrictive elements 2 and 3 of FIG. 1. Elements 7 and 8 are made of a soft magnetic material of high permeability having a large magnetostrictive constant, such as a permalloy alloy (trademark for various nickel-iron alloys) or an amorphous magnetic alloy. The shaft 1 is supported by a pair of bearings 9 and 10, on which a hollow cylindrical coil bobbin 11, made of a non-magnetic electrically insulating material such as synthetic resin is mounted and supported at the two ends thereof, so as to surround the shaft 1 across a small radial gap. The bobbin 11 has a pair of annular recesses formed on the outer side surface thereof in axial alignment with the two groups of magnetostrictive elements 7 and 8 in chevron pattern, and a pair of detection coils 12 and 13 are wound around the bobbin within the respective recesses so as to be in axial alignment with the respective groups 7 and 8 of magnetostrictive elements. More specifically, the two annular recesses formed on the outer side surface of the coil bobbin 11 are stepped at axial end portions thereof, as shown clearly in FIG. 2, wherein the two detection coils 12 and 13 are accommodated within the lower stepped portion of the two recesses, respectively. Two magnetic yokes 14 and 15, made of a soft magnetic material of high permeability, are accommodated within the respective recesses on the bobbin 11 and supported at the axial end portions thereof on the steps formed at the axial ends of the recesses so that small radial gaps 14a and 15a are formed between the coils 12 and 13 and the respective yokes 14 and 15. Examples of suitable soft magnetic materials are Permalloy PC alloys (Permalloy is a trademark, PC is a class-identifying designation for a nickel-iron alloy containing 70 to 80 wt % nickel as designated in Japanese Industrial Standards (JIS) C2531) and an amorphous iron-cobalt (Fe-Co) alloy having a magnetostrictive constant of as small as about 1 to 3. The yokes 14 and 15 are secured to the coil bobbin 11 at their axial end portions by means of adhesive tape, etc. Further, a hollow cylindrical shield 16 made of a metallic material of high conductivity such as Cu (copper) or Al (aluminum) surrounds both the yokes 14 and 15, radial gaps 14b and 15b being formed between the yokes 14, 15, and the shield 16. A detection circuit 18 is coupled to the output terminals of the detection coils 12 and 13.

Figure 3:
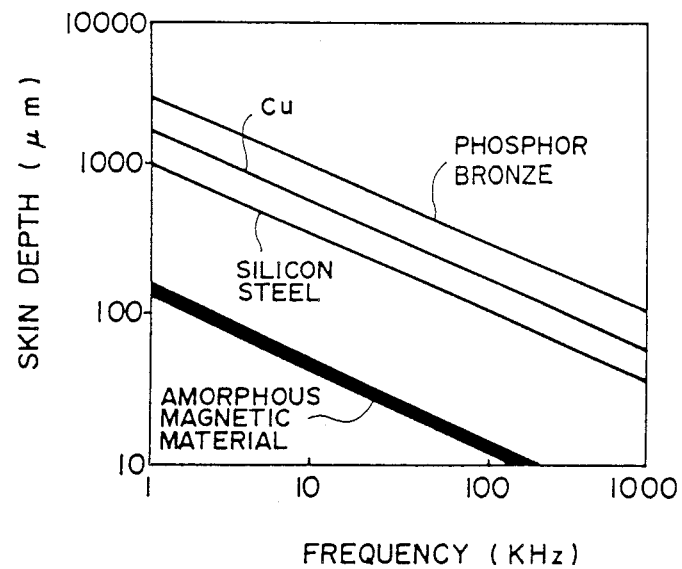
FIG. 3 shows the skin depth (penetration depth) of the magnetic flux with respect to the frequency of the magnetic flux.

The method of operation of the strain detector of FIG. 2 is as follows. When the shaft 1 is driven in the direction T, for example, around the axis 6, a torque is applied to the shaft 1 to develop stresses therein. As a result, the groups of magnetostrictive elements 7 and 8 are subjected to strains so that the permeabilities thereof vary in accordance with the strains developed therein. The detection coils 12 and 13 detect the variations of the permeabilities from the variations in the magnetic impedance of the magnetic circuits comprising the two groups of magnetostrictive elements 7 and 8, respectively. On receiving the outputs of the detection coils 12 and 13, the detection circuit 18 obtains the difference of the two outputs from the detection coils 12 and 13, the differential output being output from the detection circuit 18 as a strain detection output V corresponding to the torque applied to the shaft 1. The yokes 14 and 15 made of a high permeability soft magnetic material pass therethrough the magnetic fluxes generated by the detection coils 12 and 13, respectively, so as to decrease the magnetic impedance of the magnetic circuits with respect to the detection coils 12 and 13 and thereby to enhance the detection sensitivity and efficiency. As a result, the detection coils 12 and 13 can be driven at a low current level to minimize the generation of heat therein and thereby suppress the power-on drift (the variation of the characteristics during the power-on period). The shield 16 made of a high-conductivity non-magnetic metallic material prevents magnetic flux leakage and the intrusion of exterior magnetic fields by means of the skin effect by which the skin depth (penetration depth) of the magnetic flux is reduced during high frequency operation. This skin effect is shown in FIG. 3 in which the skin depth of magnetic flux of various materials including copper is plotted as a function of the operating frequency. It is apparent from FIG. 3 that the magnetic flux is completely cut off (shielded off) by a high conductivity metallic material at a frequency above 5 kHz, which is the frequency of the power supplied to the detection coils 12 and 13.

Thus, the provision of the shield 16 prevents the magnetic flux leakage and the intrusion of exterior disturbances of the magnetic fields. Further, by means of the provision of the gaps 14a, 14b, 15a and 15b between the yokes 14 and 15 and the detection coils 12 and 13 and between the yokes 14 and 15 and the shield 16, the generation of thermal stresses and the propagation thereof caused by the differences in the coefficients of linear thermal expansion of these members can be prevented. Thus, the variation of the magnetic properties of the yokes 14 and 15 resulting from the stresses applied thereto is minimized, and hence the precision of the strain detection is enhanced. Further, since the coil bobbin 11 has an integral structure (i.e., both the coils 12 and 13 are mounted on one integral bobbin 11), the winding operation of the coils 12 and 13 in the assembly of the detector can be simplified, and the precision of the winding can be enhanced. On the other hand, since separate yokes 14 and 15 are provided for respective coils 12 and 13, the interference of magnetic impedance of the two magnetic circuits with respect to the two detection coils 12 and 13 can be prevented. Further, since the yokes 14 and 15 are made of a magnetic material with a small magnetostrictive constant, generation of accoustic noises that takes place due to the magnetostriction thereof when the coils 12 and 13 are driven in an audible frequency range is effectively prevented, while the variation of the magnetic impedance of the magnetic circuits caused by external stresses applied to the yokes 14 and 15 is minimized.

Figure 4:
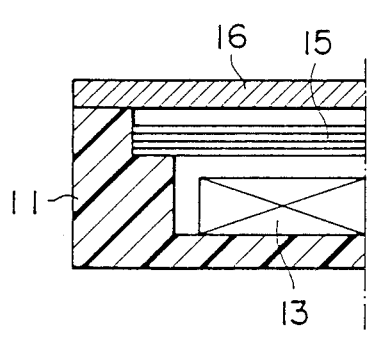
FIGS. 4 and 5 are partially sectional side views of two modifications of the structure of the detector shown in FIG. 2.

FIG. 4 shows a second embodiment which is a modification of the first embodiment described above. In this embodiment, the magnetic yokes 14 and 15 have a multilayer structure consisting of 5 to 20 layers or turns. Thus, the generation of heat in the yokes 14 and 15 during high frequency operation can be prevented more effectively.

Figure 5:
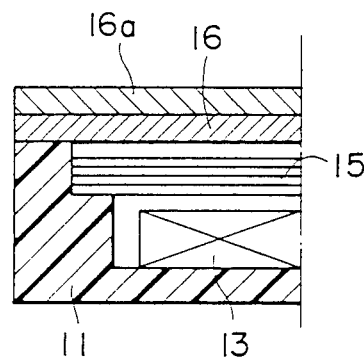

FIG. 5 shows a third embodiment which is also a modification of the first embodiment. The third embodiment further comprises a second shield 16a of non-magnetic metallic material around the outer circumference of the shield 16. Thus, the shielding effect is further enhanced. The shield 16, which has a sufficient strength, may serve as the bobbin for the shield 16a, around which the shield 16a is wound.

Figure 6:
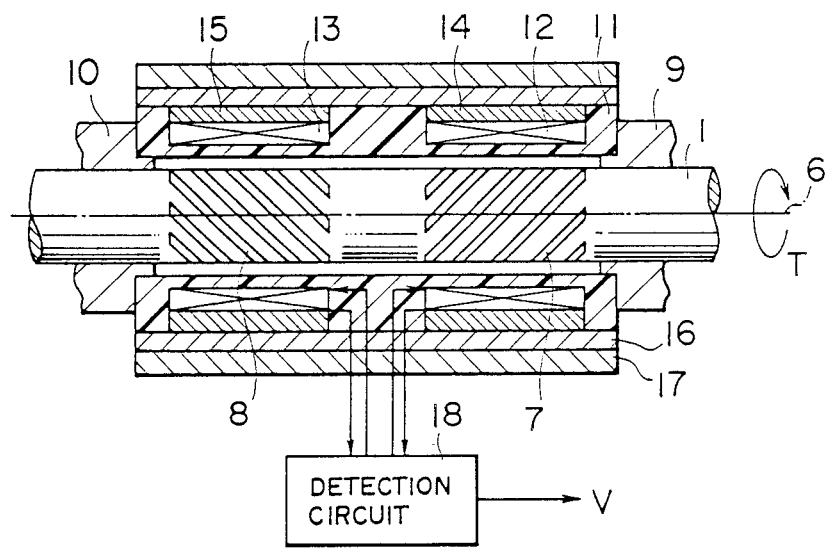
FIG. 6 is a view similar to that of FIG. 2, but showing a detector according to a fourth and a fifth embodiment of this invention.

FIG. 6 shows a fourth embodiment of this invention having a structure similar to the first embodiment except that a second hollow cylindrical shield 17 made of a magnetic material is fitted around the first shield 16 made of a non-magnetic material of high electrical conductivity. The annular gaps 14a, 14b, 15a, and 15b provided on both the inner and outer sides of the yokes 14 and 15 in the first embodiment shown in FIG. 2 may be dispensed with, as shown in FIG. 6. However, it is preferred that such gaps are also provided in this embodiment, although not shown in FIG. 6.

The fourth embodiment of FIG. 6 is characterized by the materials utilized for various members. Namely, the two groups of magnetostrictive elements 7 and 8 are made of a nickel-iron alloy containing 45 to 55 wt. % nickel a Permalloy PE alloy (PE is a class designation) (Japanese Industrial Standard (JIS) C2531). Further, the yokes 14 and 15 are made of a nickel-iron alloy (Permalloy PC alloy in JIS C2531) containing about 80 wt. % nickel and having magnetostriction that is zero or negligibly small. It is further noted that the yokes 14 and 15 made of a Permalloy PC alloy are tough against stresses. The first shield 16 is made of a non-magnetic material of high conductivity, as is the corresponding shield 16 of the first embodiment. On the other hand, the second shield 17 is made of a high-permeability nickel-iron alloy (a Permalloy PC alloy in JIS C2531).

The operation of the fourth embodiment is similar to that of the first embodiment described above. However, in the fourth embodiment, the groups of magnetostrictive elements 7 and 8, the yoke 14 and 15, and the second shield 17 are made of Permalloy alloys as specified above. Thus, they are magnetically stable over long periods of use and are tough and do not require careful handling during assembly. More specifically, since the groups of magnetostrictive elements 7 and 8 are made of Permalloy PE alloy, which has a high permeability and a large magnetostrictive constant, the detection sensitivity is improved and a wide dynamic range can be obtained. Further, the yokes 14 and 15, which have the functions of concentrating and passing therethrough the magnetic flux generated by the detection coils 12 and 13 and to prevent the magnetic flux leakage and to multiply the detection sensitivity several times, are made of a Permalloy PC alloy, which has a magnetostriction which is zero or negligible. As a result, resonance due to magnetostriction thereof does not take place and hence the generation of acoustic noises therein can be effectively prevented. Consequently, irksome noises that are generated by the yokes 14 and 15 when the coils 12 and 13 are driven at an audible frequency can be effectively prevented. In addition, the sensitivity of the magnetic impedance with respect to spurious exterior stress disturbances can be reduced. Further, the second shield 17 made of a Permalloy PC alloy functions as a magnetic shield. It is noted that the shielding effect of the second shield 17 can be enhanced in the high frequency range by adoption of a multilayer structure in which a coating of an electrically insulating material such as MgO (magnesium oxide) is applied thereon.

Referring again to FIG. 6, a fifth embodiment will now be described. This fifth embodiment has the same structure as the fourth embodiment, but the materials of which the yokes 14 and 15 and the second shield 17 are made are different from in the fourth embodiment. Namely, the yokes 14 and 15 are made of steel plate 6.5 wt. % comprising Si (silicon) of balance and a Fe of (iron) and having a Vickers hardness Hv of about 500. This steel will be referred to as a 6.5% Si-Fe steel. The second shield 17 may be made of a conventional soft magnetic material of high permeability (as explained below), or of the above described 6.5% Si-Fe steel plate.

The advantage of adoption of 6.5% Si-Fe steel plate as the material of yokes 14 and 15 and possibly of the second shield 17, compared with the case where a conventional soft magnetic material of high permeability such as an amorpous alloy or a slicon steel is utilized, is as follows.

First, the problem of conventional magnetic materials will be described. Amorphous alloys have a high permeability of the order of about $10^5$ and thus have good magnetic characteristics. However, the magnetic circuits for the detection coils 12 and 13 include air layers or air gaps as well as members made of magnetic materials, and these air gaps are primary factors for determining the magnetic impedance of the magnetic circuits. Thus, a high permeability of the above order is not necessary for the yokes 14 and 15, etc., and a permeability of about $10^4$ is sufficient. In addition, the amorphous alloys are expensive and have a great hardness which renders the working thereof difficult. Further, since the ferrous amorphous alloys and conventional silicon steel plates are not so-called zero-magnetostriction materials, they may be subjected to resonance due to magnetostriction, thereby reducing the detection accuracy and sensitivity.

On the other hand, 6.5% Si-Fe steel is of zero magnetostriction, has a Vickers hardness Hv of about one half of that of the amorphous alloys, and is inexpensive. Thus, the following advantages result from the utilization 6.5% Si-Fe steel as the material of the yokes 14 and 15. Namely, since the hardness of 6.5% Si-Fe steel is about one half of that of amorphous aloys, the workability is greatly enhanced. Further, since 6.5% Si-Fe steel is a so-called zero magnetostriction material, resonance does not take place and the detection sensitivity and accuracy are improved. On the other hand, although the maximum permeability of the 6.5% Si-Fe steel is $5.8 \times 10^4$ which is smaller than the corresponding value of amorphous alloys by one figure, this decrease in the permeability of the yokes 14 and 15 hardly affects the function of magnetic flux concentration of the yokes 14 and 15, since, as described above, the air gaps present within the magnetic circuits are the primary factors which determine the magnetic impedance thereof.

Similar advantages result from the utilization of 6.5% Si-Fe steel as the material of the second shield 17.

While description has been made of the particular embodiments of this invention, it will be understood that many modifications may be made without departing from the spirit thereof. The appended claims are contemplated to cover any such modifications as fall within the true spirit and scope of this invention.

What is claimed is:

1. A strain detector for detecting a strain developed in a cylindrical shaft, said strain detector comprising:
    thin magnetostrictive elements, made of a soft magnetic material of a high permeability, attached to an outer circumferential surface of the shaft, the permeability of the magnetostrictive elements varying in accordance with a strain developed therein;
    detection coil means, including a coil disposed around said shaft to surround the magnetostrictive elements, for detecting a variation of the permeability of the magnetostrictive elements;
    a hollow cylindrical yoke, made of a soft magnetic material of a high permeability, disposed around said coil of the detection coil means across a radial gap formed between an outer surface of the coil and an inner surface of the cylindrical yoke; and
    a hollow cylindrical magnetic shield disposed around said yoke across a radial gap formed between an outer surface of the yoke and an inner surface of the shield.

2. A strain detector as claimed in claim 1, wherein said magnetic shield comprises a hollow cylindrical shield made of a non-magnetic material of high electrical conductivity.

3. A strain detector as claimed in claim 2, wherein said magnetic shield further comprises a second hollow cylindrical shield made of a nickel-iron alloy containing 70 to 80 percent by weight of nickel and disposed around said shield of non-magnetic material.

4. A strain detector as claimed in claim 3, wherein said magnetostrictive elements comprises two groups of magnetostrictive elements attached to the outer surface of the shaft, said two groups of elements being axially separated from each other, said detection coils means comprising two coils each disposed around one of the two groups of magnetostrictive elements in axial alignment, wherein said strain detector comprises:
    a hollow cylindrical integrally formed coil bobbin made of a non-magnetic material disposed around said shaft and having a pair of recesses formed on an outer surface thereof to accommodate said two coils of the detection coil means; and
    two separately formed yokes made of a soft magnetic material of a high permeability each surrounding one of said two coils of the detection coil means in axial alignment.

5. A strain detector as claimed in claim 2, wherein said magnetic shield further comprises a second hollow cylindrical shield made of a steel comprising 6.5 wt. % of Si and a balance of Fe and disposed around said shield of non-magnetic material.

6. A strain detector as claimed in claim 5, wherein said magnetostrictive elements comprises two groups of magnetostrictive elements attached to the outer surface of the shaft, said two groups of elements being axially separated from each other, said detection coils means comprising two coils each disposed around one of the two groups of magnetostrictive elements in axial alignment wherein said strain detector comprises:
    a hollow cylindrical integrally formed coil bobbin made of a non-magnetic material disposed around said shaft and having a pair of recesses formed on an outer surface thereof to accommodate said two coils of the detection coil means; and
    two separately formed yokes made of a soft magnetic material of a high permeability each surrounding one of said two coils of the detection coil means in axial alignment.

7. A strain detector as claimed in claim 2, wherein said magnetostrictive elements comprises two groups of magnetostrictive elements attached to the outer surface of the shaft, said two groups of elements being axially separated from each other, said detection coils means comprising two coils each disposed around one of the two groups of magnetostrictive elements in axial alignment, wherein said strain detector comprises:
    a hollow cylindrical integrally formed coil bobbin made of a non-magnetic material disposed around said shaft and having a pair of recesses formed on an outer surface thereof to accommodate said two coils of the detection coil means; and
    two separately formed yokes made of a soft magnetic material of a high permeability each surrounding one of said two coils of the detection coil means in axial alignment.

8. A strain detector as claimed in claim 1, wherein said magnetostrictive elements are made of a nickel-iron alloy containing 45 to 55 percent by weight of nickel.

9. A strain detector as claimed in claim 8, wherein said magnetostrictive elements comprises two groups of magnetostrictive elements attached to the outer surface of the shaft, said two groups of elements being axially separated from each other, said detection coils means comprising two coils each disposed around one of the two groups of magnetostrictive elements in axial alignment, wherein said strain detector comprises:
- a hollow cylindrical integrally formed coil bobbin made of a non-magnetic material disposed around said shaft and having a pair of recesses formed on an outer surface thereof to accommodate said two coils of the detection coil means; and
- two separately formed yokes made of a soft magnetic material of a high permeability each surrounding one of said two coils of the detection coil means in axial alignments.

10. A strain detector as claimed in claim 1, wherein said yoke is made of a nickel-iron alloy containing 70 to 80 percent by weight of nickel.

11. A strain detector as claimed in claim 10, wherein said magnetostrictive elements comprises two groups of magnetostrictive elements attached to the outer surface of the shaft, said two groups of elements being axially separated from each other, said detection coils means comprising two coils each disposed around one of the two groups of magnetostrictive elements in axial alignment, wherein said strain detector comprises:
- a hollow cylindrical integrally formed coil bobbin made of a non-magnetic material disposed around said shaft and having a pair of recesses formed on an outer surface thereof to accommodate said two coils of the detection coil means; and
- two separately formed yokes made of a soft magnetic material of a high permeability each surrounding one of said two coils of the detection coil means in axial alignment.

12. A strain detector as claimed in claim 1, wherein said yoke is made of a steel comprising 6.5 wt. % of Si and a balance of Fe.

13. A strain detector as claimed in claim 12, wherein said magnetostrictive elements comprises two groups of magnetostrictive elements attached to the outer surface of the shaft, said two groups of elements being axially separated from each other, said detection coils means comprising two coils each disposed around one of the two groups of elements in axial alignment, wherein said strain detector comprises:
- a hollow cylindrical integrally formed coil bobbin made of a non-magnetic material disposed around said shaft and having a pair of recesses formed on an outer surface thereof to accommodate said two coils of the detection coil means; and
- two separately formed yokes made of a soft magnetic material of a high permeability each surrounding one of said two coils of the detection coil means in axial alignment.

14. A strain detector as claimed in claim 1, wherein said magnetostrictive elements comprises two groups of magnetostrictive elements attached to the outer surface of the shaft, said two groups of elements being axially separated from each other, said detection coils means comprising two coils each disposed around one of the two groups of magnetostrictive elements in axial alignment, wherein said strain detector comprises:
- a hollow cylindrical integrally formed coil bobbin made of a non-magnetic material disposed around said shaft and having a pair of recesses formed on an outer surface thereof to accommodate said two coils of the detection coil means; and
- two separately formed yokes made of a soft magnetic material of a high permeability each surrounding one of said two coils of the detection coil means in axial alignment.

* * * * *